US007967116B2

(12) United States Patent
Boerschig (10) Patent No.: US 7,967,116 B2
(45) Date of Patent: Jun. 28, 2011

(54) LOAD COMPENSATING HYDRAULIC RATE CONTROL

(75) Inventor: Timothy J. Boerschig, Amherst, NY (US)

(73) Assignee: Enidine, Inc., Orchard Park, NY (US)

( * ) Notice: Subject to any disclaimer, the term of this patent is extended or adjusted under 35 U.S.C. 154(b) by 868 days.

(21) Appl. No.: 11/953,477

(22) Filed: Dec. 10, 2007

(65) Prior Publication Data

US 2009/0146351 A1    Jun. 11, 2009

(51) Int. Cl.
*F16F 9/34* (2006.01)
(52) U.S. Cl. .................. 188/282.1; 188/322.15
(58) Field of Classification Search ............... 188/282.1, 188/282.3, 322.15, 322.22
See application file for complete search history.

(56) References Cited

U.S. PATENT DOCUMENTS

| 3,999,745 | A | | 12/1976 | Mahoff | |
|---|---|---|---|---|---|
| 5,251,655 | A | | 10/1993 | Low | |
| 5,303,804 | A | * | 4/1994 | Spiess | 188/266.5 |
| 5,409,088 | A | * | 4/1995 | Sonsterod | 188/282.3 |
| 5,450,933 | A | * | 9/1995 | Schuttler | 188/300 |
| 6,161,662 | A | * | 12/2000 | Johnston et al. | 188/282.3 |
| 6,179,100 | B1 | * | 1/2001 | Mintgen et al. | 188/282.1 |
| 6,874,731 | B1 | | 4/2005 | Brauer et al. | |

OTHER PUBLICATIONS

Product Information Sheet from www.microhydraulics.com, 3 pgs.

* cited by examiner

*Primary Examiner* — Christopher P Schwartz
(74) *Attorney, Agent, or Firm* — Hiscock & Barclay, LLP (57) ABSTRACT

A rate control device includes an outer cylinder defining an interior chamber having a longitudinal axis and containing a hydraulic fluid. A piston head mounted to a proximal end or a piston rod is slidably positionable within the interior chamber. A rate control valve is disposed within an interior cavity of the piston head coaxially with the longitudinal axis of the interior chamber of the cylinder. The rate control valve includes a variable flow rate orifice and a fixed flow rate orifice disposed in series relationship with respect to fluid flow through the rate control valve.

23 Claims, 7 Drawing Sheets

LOAD COMPENSATING HYDRAULIC RATE CONTROL

FIELD OF THE INVENTION

This invention relates generally to rate controls for use in connection with a hydraulic piston-type device and, more particularly, to a hydraulic linear rate control device providing a near constant piston rod velocity over a wide range of applied loads.

BACKGROUND OF THE INVENTION

Hydraulic rate control piston-type devices are used in a wide variety of applications to support a component from a structural member and control the pivotal movement of the component. For example, hydraulic rate control piston-type devices are commonly used oil commercial passenger aircraft to support and control the opening rate of pivoting type overhead stowage bins. U.S. Pat. No. 6,874,731 discloses a modular overhead stowage bin system for an aircraft passenger cabin. In a wide body, multi-aisle aircraft, the overhead stowage bins include outboard stowage bins positioned above the right and left side seats of the aircraft and inboard stowage bins positioned above the center seats. The overhead stowage bin compartments are readily accessible to passengers to open the bins to stow and remove carry-on luggage, packages, coats and the like when standing in the passenger aisles. As illustrated in the aforenoted patent, each of the pivoting type overhead stowage bin buckets is mounted for pivotal movement in the bin structure. The pivot bin bucket is supported by one or more hydraulic rate control piston-type devices that controls the opening rate of the bin bucket in the bin structure.

In conventional stowage bin systems, each piston-type device connects to and extends between a mounting lug coupled to the stowage bin bucket it supports and a mounting lug coupled to the bin structure. The typical piston-type device includes a hydraulic cylinder with a piston head and piston rod. The piston head is mounted to a proximal end of the piston rod and an eye socket is mounted to a distal end of the piston rod for securing the distal end of the piston rod to the stowage bin bucket. The piston head is disposed within the housing of the cylinder for movement along the axis of the cylinder housing. The interior of the cylinder housing is filled with a hydraulic fluid. A second eye socket is mounted to the distal end of the cylinder housing for securing the piston device to the bin structure. The piston rod extends through the proximal end of the cylinder housing. Conventional hydraulic rate control devices associated with stowage bins typically cause the stowage bin to open slowly when the bin is empty, but to open faster when the bin is fully loaded.

U.S. Pat. No. 3,999,745 discloses a hydraulic rate control piston-type device for use in connection with an overhead storage bin in the passenger cabin of a commercial aircraft. The disclosed device incorporates a compression rate control valve that includes a spring-biased, inversely-tapered pin valve element disposed within a piston head mounted on the piston rod. The high side pressure acts upon the forward face of the valve element in opposition to the bias force imposed upon the rearward face of the valve element to vary the flow area of an annular orifice opening in the forward face of the piston head through which hydraulic fluid passes from the high pressure side to the low pressure side of the piston head during the compression stroke. The flow area provided by the orifice varies directly in response to the fluid pressure on the high pressure side of the piston head in inverse relationship thereto to regulate the flow of fluid therethrough as a means of controlling the rate of collapse of the piston rod device under a compression stroke imposed on the piston rod during movement of the overhead storage bin bucket in a commercial aircraft. In the disclosed piston device, a variable orifice valve having a spring-biased, tapered valve pin is attached to the head of the piston rod. As the piston head translates in compression under an applied load within the hydraulic cylinder of the device under application of a compressive load, hydraulic fluid is metered through the valve from one side of the piston head to the other side of the piston head. The hydraulic fluid passes from the high pressure side of the cylinder through a variable flow area orifice at the face of the valve into an interior valve chamber and thence therefrom through a fixed flow area into the low pressure side of the interior of the cylinder. It is stated that the valve produces a snubbing (retarding) force by restricting the flow of fluid through the variable orifice, the flow area of which is said to vary in inverse proportion to the load applied. However, since the spring biasing the tapered pin within the orifice opening in the face of the valve must have a high enough spring rate to work effectively at the higher applied loads, control of fluid flow rate through the valve to a near constant rate is not achievable over a wide range of applied loads.

Additionally, Enidine Incorporated, the assignee of this application, manufactures and sells a rate control device of the hydraulic piston-type for use in connection with controlling the opening and closing rate of a door which provides relatively constant flow rate control over a wide range of applied loads, but which has a relatively large diameter. The Enidine device includes a piston rod having a piston head disposed within a closed hydraulic cylinder filled with a hydraulic fluid. The piston rod translates outwardly along the longitudinal axis under a tensile load when the device extends as a person closes the door. The piston rod translates inwardly along the longitudinal axis under a compression load when the device collapses as a person opens the door.

This Enidine device includes a pair of Flosert® flow rate control valves, manufactured and distributed by The Lee Company, Westport, Conn., mounted in the piston head diametrically opposite each other and radially outward of the coaxial longitudinal axis along which the piston rod translates within the cylindrical housing of the piston device. One of the rate control valves is arranged to control the rate of fluid flow therethrough during the compression stroke of the device, while the other of the rate control valves is arranged to control the rate of fluid flow therethrough during the tension stroke of the device. Each flow rate control valve includes an interior chamber having a variable flow area orifice opening to the interior of the cylinder on one side of the piston head and a fixed flow area orifice opening to the interior of the cylinder on the other side of the piston head. A spring-biased valve member within the interior chamber of the valve translates axially in response to the force of the pressure differential between an intermediate pressure within the interior chamber of the valve and the low-side pressure acting against the opposing spring bias force to vary the flow area of the variable flow area orifice as the high side pressure increases or decreases under a load applied to the piston rod. As a result of the varying flow area between the high side pressure chamber of the cylinder and the subchamber of the valve, the intermediate pressure within the subchamber remains relatively constant as the high side pressure increases or decreases. As the valve member responds to the intermediate pressure acting thereon, a relatively constant flow rate control may be realized over a wider load range. However, given the radially outward positioning of the flow control valves, a relatively large diameter cylindrical housing is required which increases both the size and weight of this rate control device.

SUMMARY OF THE INVENTION

It is a general object of the present invention to improve hydraulic rate control devices.

It is an object of an aspect of the invention to provide a load compensating hydraulic rate control device.

It is an object of an aspect of the invention to provide a compact hydraulic rate control device exhibiting a relatively constant velocity of piston travel over a range of applied loads.

It is an object of an aspect of the invention to provide a hydraulic rate control device including a flow rate control valve having a self-adjusting valve member for controlling the flow rate of fluid through the piston head of the rate control device.

In an embodiment of the invention, a linear rate control device includes an outer cylinder defining an interior chamber having a longitudinal axis and containing a hydraulic fluid. A piston includes an axially slidable piston rod having a proximal end and a distal end and a piston head mounted to its proximal end and disposed within the interior chamber. The piston rod extends longitudinally along the longitudinal axis, of the interior chamber from the proximal end through a first end of the outer cylinder to the distal end thereof. A rate control valve is disposed within the piston head coaxially with the longitudinal axis of the cylinder within an interior cavity defined within the piston head. The rate control valve in conjunction with at least one hole in the piston head, defines a variable flow rate orifice and a fixed flow rate orifice disposed in series relationship with respect to fluid flow through the piston head and rate control valve. In an embodiment, the variable flow rate orifice forms a flow entrance for fluid flow to enter the rate control valve from the interior chamber of the cylinder on a high pressure side of the piston head and the fixed flow area orifice forms a flow exit for fluid flow to pass from the rate control valve into the interior chamber of the cylinder on a low pressure side of the piston head. In an alternate embodiment, the variable flow rate orifice forms a flow exit for fluid flow to pass from the rate control valve into the interior chamber of the cylinder on a low pressure side of the piston head and the fixed flow area orifice forms a flow entrance for fluid flow to enter the rate control valve from the interior chamber on a high pressure side of the piston head. In an embodiment, the linear rate control device includes a controlled flow passage established through the rate control valve during a movement of the piston rod under an applied compression load and an uncontrolled flow passage established outside the piston head during a movement of the piston rod under an applied tensile load. In an embodiment, the linear rate control device includes a controlled flow passage established through the rate control valve during a movement of the piston rod under an applied tensile load and an uncontrolled flow passage established outside the piston head during a movement of the piston rod under an applied compression load.

In an embodiment of the invention, a rate control device is provided having a substantially constant velocity characteristic over an applied load range. The rate control device includes an outer cylinder defining an interior chamber having a longitudinal axis and containing a hydraulic fluid. A piston includes a slidable piston rod having a proximal end and a distal end and a piston head mounted to its proximal end and disposed within the interior chamber. The piston rod extends longitudinally along the longitudinal axis of the interior chamber from the proximal end through a first end of the outer cylinder to the distal end thereof. A rate control valve is disposed within the piston head coaxially with the longitudinal axis of the cylinder and slidably retained within an interior cavity defined within the piston head. The rate control valve defines a subchamber within the interior cavity of the piston head. A bias spring is disposed within the interior cavity of the piston head in operative association with the rate control valve. The rate control valve includes a fixed flow area orifice, at least one hole radially through the rate control valve in communication with a groove on the outside of the rate control valve, whose groove edge, in combination with at least one first opening through the piston head, defines a variable flow area orifice. The fixed area orifice establishes a restricted fluid flow path between the subchamber within the rate control valve and the interior chamber of the cylinder on one of a low pressure side of the piston head or a high pressure side of the piston head. The variable flow area orifice establishes a restricted fluid flow path between the subchamber within the rate control valve and the interior chamber on the other one of the high pressure side of the piston head or the low pressure side of the piston head. The variable flow area orifice is formed cooperatively by registration of a groove edge on the rate control valve and at least one first opening through the piston head. The rate control valve is axially repositionable within the interior cavity of the piston head against the bias spring in response to the fluid pressure within the subchamber of the rate control valve to vary the flow area through the variable flow area orifice.

In an embodiment of the invention, a rate control device is provided having a substantially constant velocity characteristic over a range of applied load for both compression and tension loading. The rate control device includes an outer cylinder defining an interior chamber having a longitudinal axis and containing a hydraulic fluid. A piston includes a slidable piston rod having a proximal end and a distal end and a piston head mounted to its proximal end and disposed within the interior chamber. The piston rod extends longitudinally along the longitudinal axis of the interior chamber from the proximal end through a first end of the outer cylinder to the distal end thereof. A rate control valve is slidably retained within an interior cavity defined within the piston head and disposed coaxially with the longitudinal axis of the cylinder. In this embodiment, the rate control valve defines an interior chamber and having an interior wall dividing the interior chamber of the valve into a first subchamber and a second subchamber. A first bias spring is disposed in the interior cavity of the piston head in operative association with and forwardly of the rate control valve. A second bias spring is disposed in the interior cavity of the piston head in operative association with and rearwardly of the rate control valve. A fixed flow area orifice is provided in the interior wall of said rate control valve to establish a restricted internal fluid flow path between the first and second subchambers. In this embodiment, a groove on the outside of the rate control valve, whose groove edge, in combination with at least one first opening through the piston head, defines a first variable flow area orifice that establishes a restricted fluid flow path between the first subchamber and the interior chamber of the cylinder on one of a high pressure side of the piston head or a low pressure side of the piston head and a second variable flow area orifice that establishes a restricted fluid flow path between the second subchamber and the interior chamber on the other of a low pressure side of the piston head or a high pressure side of the piston head. The rate control valve is axially repositionable within the interior cavity of the piston head against one of the first and second bias springs in response to an intermediate fluid pressure within one of the first and second subchambers to vary the flow area through one of the first and second variable flow area orifices. This embodiment provides either equal constant velocity control in both directions or different constant velocity control in each direction.

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
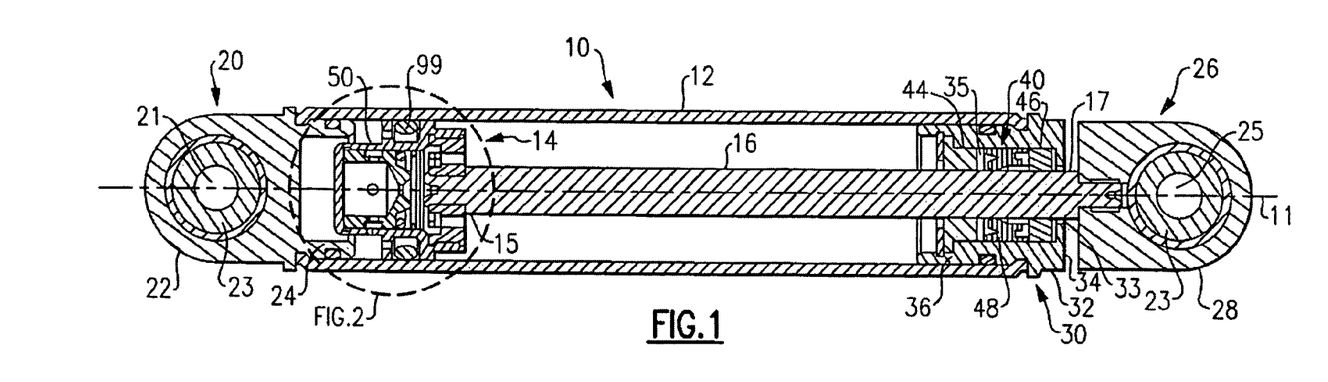
FIG. 1 is a sectioned elevation view of a first exemplary embodiment of a hydraulic rate control device in accord with the invention for providing rate control under compression.
Figure 5:
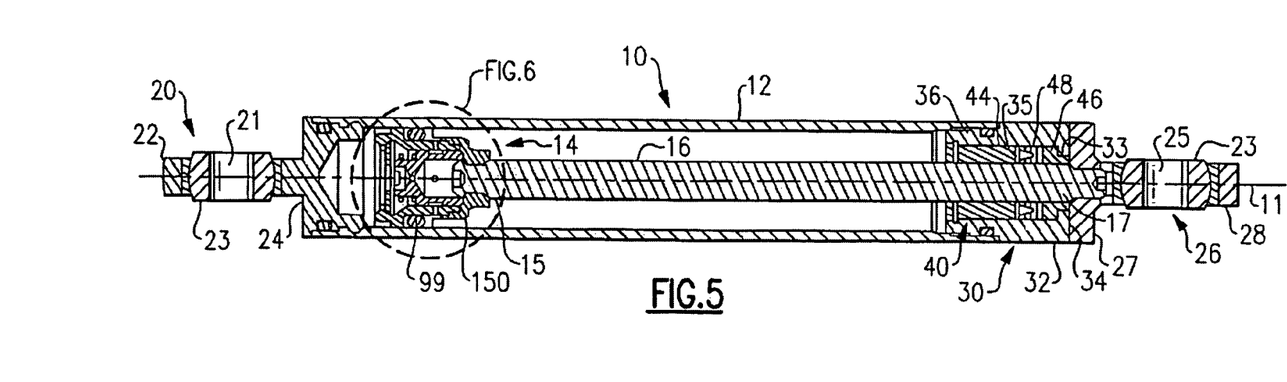
FIG. 5 is a sectioned elevation view of a second exemplary embodiment of a hydraulic rate control device in accord with the invention for providing rate control under tension.

Referring initially to FIGS. 1 and 5 of the drawing, there are depicted exemplary embodiments of a hydraulic rate control device 10 in accordance with the present invention. The rate control device 10 includes a cylindrical tube 12 extending along a longitudinal axis 11 and a piston assembly 14 that includes a piston rod 16 having a proximal end 15 and a distal end 17, and a piston head assembly 50, 150 mounted to the proximal end 15 of the piston rod 16 and housed within the interior of the cylindrical tube 12. The cylindrical tube 12 has a first cylinder end assembly 20 mounted to a first end of the cylindrical tube 12 and a second cylinder end assembly 30 mounted to a second end of the cylindrical tube 12. The first cylinder end assembly 20 includes an end member 22 defining an eye socket 21 housing a spherical bearing 23 and having a base end 24 extending into the first end of the cylindrical tube 12 in scaled relationship with the inner wall of the cylindrical tube 12. The second cylinder end assembly 30 includes annular plug 32 having a head 34 with a central opening 33 therein and an annular shaft 36 extending from the head 34 axially into the second end of the cylindrical tube 12.

The annular shaft 36 defines a central cavity 35 aligned coaxially with the central opening 33 and the longitudinal axis 11 of the cylindrical tube 12.

The piston rod 16 extends along the longitudinal axis of the cylindrical tube 12 and through the central cavity 35 and the central opening 33 in the head 34 of the end plug 32 of the second cylinder end assembly 30 whereby the distal end 17 of the piston rod 16 is disposed externally of the cylindrical tube 12. The piston rod 16 is supported for axial translation under load along the longitudinal axis 11 of the cylindrical tube 12 by means of a rod bearing assembly 40 housed within the central cavity 35 in the end plug 32. The rod bearing assembly 40 includes an inner annular bearing 44, an outer annular bearing 46 and an annular sealing member 48 disposed between the inner and outer-annular bearings.

A piston end assembly 26 is mounted to the distal end 17 of the piston rod 16. The piston end assembly 26 includes an end member 28 having a base end 27 secured to the distal end 17 of the piston rod 16 and defining an eye socket 25 housing a spherical bearing 23. Each of the piston end assemblies 22 and 26 is adapted to receive a mounting pin (not shown) for securing the rate control device 10 between a first mount (not shown) and a second mount (not shown). For example, one of the end members may be pinned to a mounting bracket or lug coupled to the stowage bin bucket and the other of the end members pinned to a mounting bracket or lug coupled to the bin structure.

Figure 2:
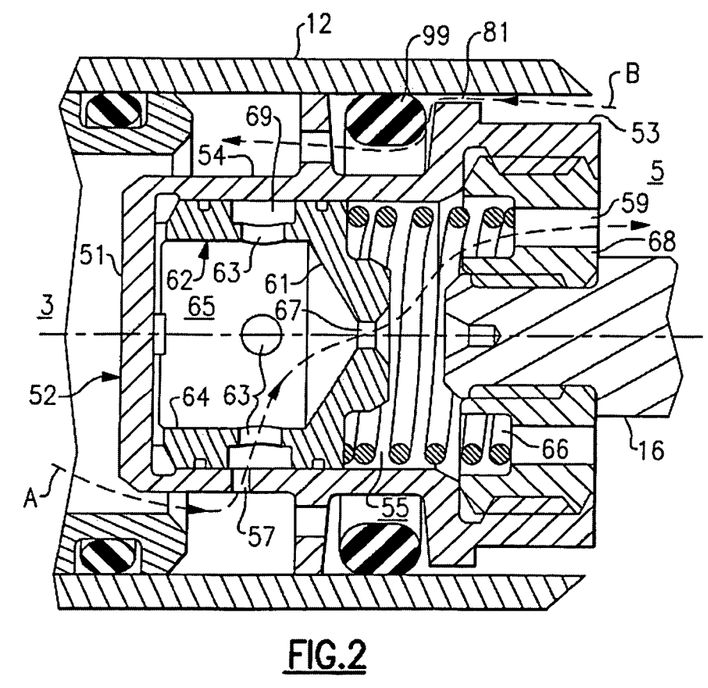
FIG. 2 is an enlarged sectioned elevation view of the embodiment of the flow rate control valve illustrated in the circled region of FIG. 1.
Figure 3:
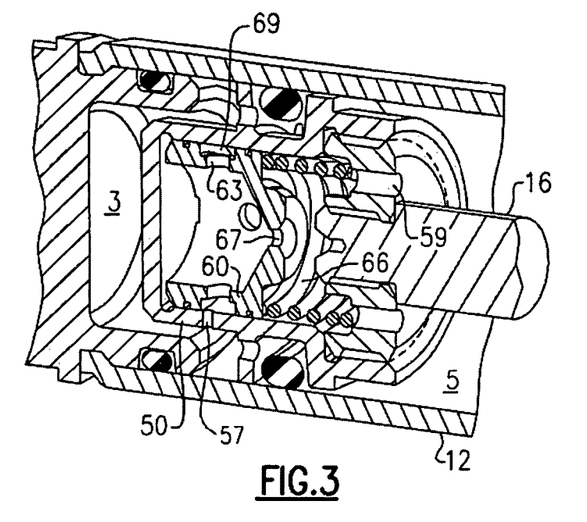
FIG. 3 is a perspective view, in section, of the circled region of FIG. 1.

The hydraulic rate control device 10 of the present invention provides linear rate control over movement of the piston rod in response to application of a load by metering the flow of hydraulic fluid from a first chamber 3 defined as the interior of the cylindrical tube 12 on a high pressure side of the piston head assembly 50, 150 to a second chamber 5 defined as the interior of the cylindrical tube 12 on a low pressure side of the piston head assembly 50, 150. In the exemplary embodiment of the rate control device 10 shown in FIG. 1, linear rate control is provided under a compression load by controlling the rate of flow of hydraulic fluid from the high pressure side chamber 3 to the low pressure side chamber 5 within the interior of the cylindrical tube 12 under a compression stroke through a flow rate control valve 60 disposed within the piston head assembly 50, as illustrated in FIG. 2 wherein the flow stream A represents the controlled flow passing through the flow rate control valve 60 and the flow stream B represents the free flow, i.e. uncontrolled flow, of fluid from chamber 5 to back to chamber 3 on the return stroke of the piston rod. In the exemplary embodiment of the rate control device 10 shown in FIG. 5, linear rate control is provided under a tensile load by controlling the rate of flow of hydraulic fluid from the high pressure side chamber 3 to the low pressure chamber side 5 within the interior of the cylindrical tube 12 under a tension stroke through a flow rate control valve 160 disposed within the piston head assembly 150, as illustated in FIG. 6 wherein flow stream A represents the controlled flow passing through the flow rate control valve 160 and the now stream B represents the free flow, i.e. uncontrolled flow, of fluid from chamber 5 to back to chamber 3 on the return stroke of the piston rod.

Referring now specifically in FIGS. 1-4, the piston head assembly 50 includes a piston bead body 52 having a generally cylindrical outer shell 54 having a forward end face 51 and a rearward end flange 53 mounted to the proximal end 15 of the piston rod 16. The piston head assembly 50 is axially moveable within the interior of the cylindrical tube 12. An intermediate flange 80 extends outwardly from the piston head body 52 to abut the inner wall of the cylindrical tube 12 forwardly of the flange 53. The piston head body carries an outer O-ring seal 99 about its outer circumference positioned between the rearward end flange 53 and the intermediate flange 80. In an embodiment, a circumferential flow gap 81 is provided between the flange 53 and the inner wall of the cylindrical tube 12, and at least one flow passage 83 is provided through the intermediate flange 80. In this embodiment, the O-ring seal 99 may comprise a "floating" O-ring that engages the inner wall of the cylindrical tube 12 to provide an efficient seal between the outer circumference of the piston head body 52 and cylindrical tube 12 when the piston rod 16 is under an applied compression load, but allowing fluid to pass in free flow about the outside of the piston head body 52 and the inner wall of the cylindrical tube 12 via the flow gap 81 and the at least one flow passage 83 when the piston rod 16 is under an applied tension load, as illustrated by flow stream B in FIG. 2. The outer shell 54 of the piston head body 52 defines an interior cavity 55, referred to herein as a valve chamber, which houses the flow rate control valve 60.

The flow rate control valve 60 includes an axially positionable valve member 62 and a bias spring 66 that are retained within the valve chamber 55 by means of a valve retainer body 68 secured within a central opening in the rearward end flange 53 of the outer shell 54. The valve member 62 has a generally cylindrical body 64 with a groove 69 cut in the OD of the cylindrical body 64 and a rearward end cap 61. At least one opening 63 is provided in and extends through the circumferential wall of the generally cylindrical body 62. The body 64 of the valve member 62, in association with the forward end of the outer shell 54 of the piston head body 52, defines a subchamber 65 within the valve chamber 55. A central opening 67 is provided in the rearward end cap 61. The bias spring 66 is positioned within the valve chamber 55 rearwardly of the valve member 62 and seats against the forward face of the valve retainer body 68 and against the valve member 62.

Figure 4:
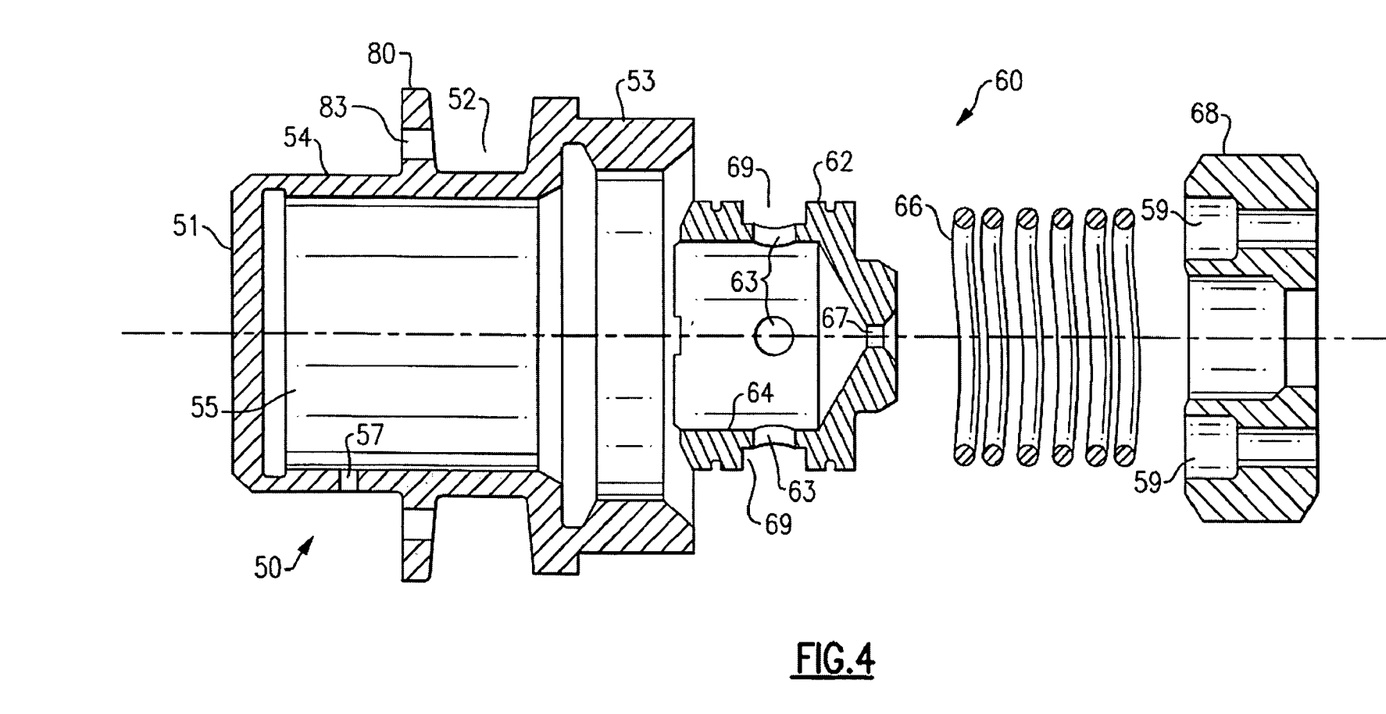
FIG. 4 is an exploded view, in section, illustrating the assembly of the flow rate control valve depicted in FIG. 2.

Referring now to FIG. 4, to assemble the flow rate control valve 60, the axially positionable valve member 62 is inserted into the valve chamber 55 defined by the outer shell 54 of the piston head body 52, followed by the bias spring 66. Then the valve retainer body 68 is secured, for example threaded or splined, within the rearward end flange 53 of the outer shell 54 and then the assembled piston head assembly 50 is mounted, for example threaded or splined, onto the proximal end 15 of the piston rod 16. The valve retainer body 68 serves not only to retain the valve member 62 and bias spring 66 within the valve chamber 55, but also to preload the bias spring 66 against the rearward end cap 61 of the valve member 62.

With the flow rate control valve assembly 60 mounted within the valve chamber 55 of the piston head 50, a first fluid flow path is provided from the high pressure side chamber 3 within the cylindrical lube 12 into the subchamber 65 within the valve member 62 via at least one first port 57 provided in and extending through the circumferential wall of the outer shell 54, through the groove 69 and at least one second port 63 provided in and extending through the circumferential wall of the generally cylindrical body of the valve member 62. A second fluid flow path is provided from the subchamber 65 via the central opening 67 in the rearward end cap 61 of the valve member 62 into the valve chamber 55 of the piston head assembly 50 and thence into the low pressure side chamber 5 within the cylindrical tube 12 via a third opening 59 in and through the valve retainer body 68. Together, these fluid flow paths provide fluid flow communication between the first chamber 3 and the second chamber 5 via the flow rate control valve assembly 60.

Referring now specifically in FIGS. 5-8, the piston head assembly 150 includes a piston head body 152 having a generally cylindrical outer shell 154 and a forward end member 151, a forward flange 143 and a rearward end flange 153 mounted to the proximal end 15 of the piston rod 16. The piston head assembly 150 is axially moveable within the interior of the cylindrical tube 12. An intermediate flange 180 extends outwardly from the piston head body 152 to abut the inner wall of the cylindrical tube 12 rearward of the forward flange 143. The piston head body 152 carries an outer O-ring seal 99 about its outer circumference positioned between the forward flange 143 and the intermediate flange 180. In an embodiment, a circumferential flow gap 181 is provided between the forward flange 143 and the inner wall of the cylindrical tube 12, and at least one flow passage 183 is provided through the intermediate flange 180. In this embodiment, the O-ring seal 99 may comprise a "floating" O-ring that engages the inner wall of the cylindrical tube 12 to provide an efficient seal between the outer circumference of the piston head body 152 and cylindrical tube 12 when the piston rod 16 is under an applied tension load, but allowing fluid to free flow between piston head body 152 and the inner wall or the cylindrical tube 12 via the flow gap 181 and the at least one flow passage 183 when the piston rod 16 is under an applied compression load, as illustrated by flow stream B in FIG. 6. The outer shell 154 of the piston head body 152 defines an interior cavity 155, referred to herein as a valve chamber, which houses the flow rate control valve 160. The flow rate control valve 160 includes an axially positionable valve member 162 and a bias spring 166 that are retained within the valve chamber 155 by means of the forward end member 151. A central opening 159 is provided in the forward end member 151. The valve member 162 has a generally cylindrical outer body 164 with a forward end cap 161 having a generally cylindrical, forwardly extending tip portion stepped radially inwardly from the outer body 164 and extending coaxially forwardly therefrom. The body 164 of the valve member 162, in association with the forward end of the outer shell 154 of the piston head body 152, defines a subchamber 165 within the valve chamber 155. A central opening 167 is provided in the forward end cap 161.

Figure 8:
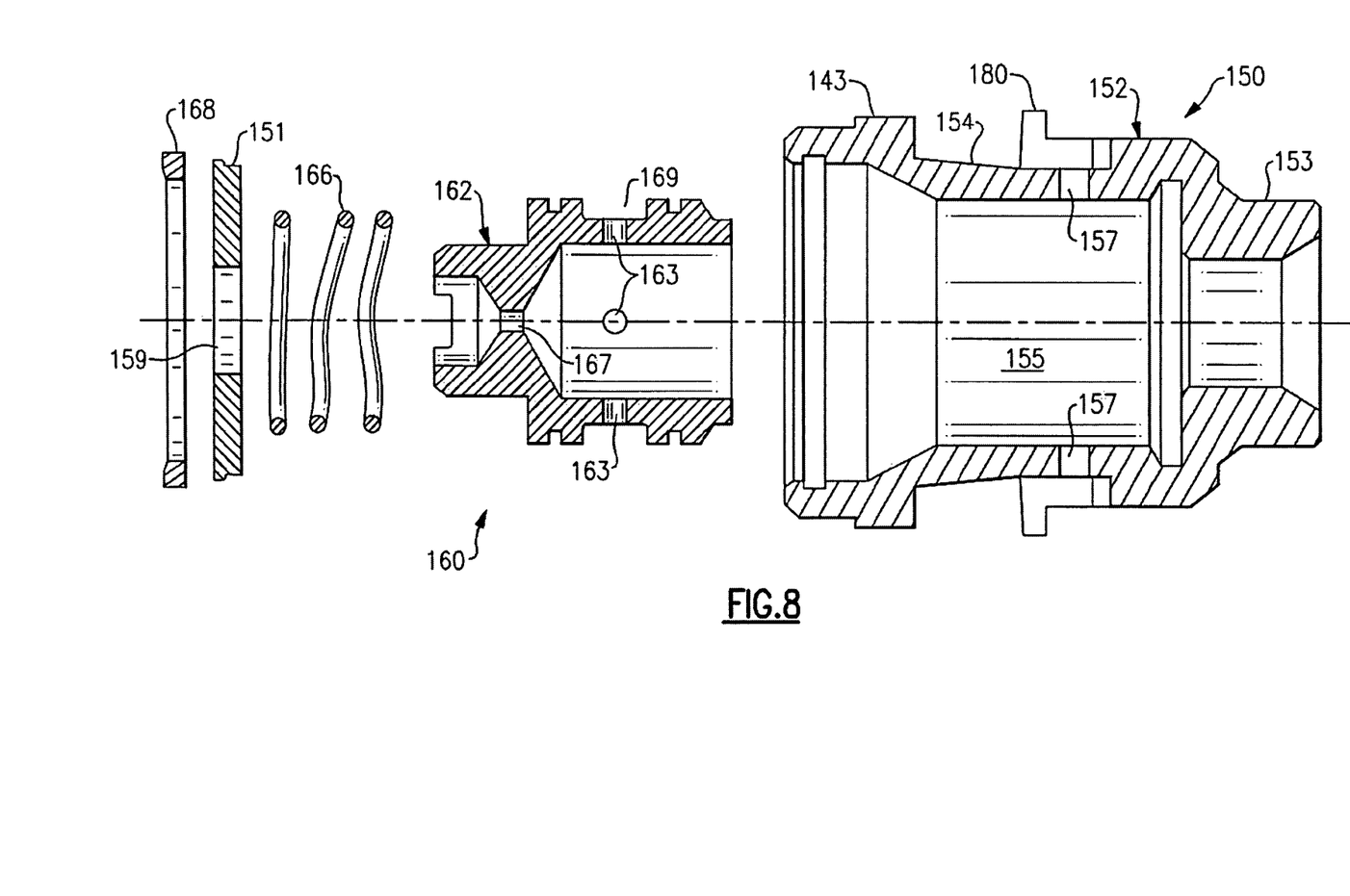
FIG. 8 is an exploded view, in section, illustrating the assembly of the flow rate control valve depicted in FIG. 6.

Referring now to FIG. 8, to assemble the flow rate control valve 160, the axially positionable valve member 162 is inserted into the valve chamber 155 defined by the outer shell 154 of the piston head body 152, followed by the bias spring 166 which is positioned forwardly of the valve member 162 and coaxially about the forwardly extending portion of the forward end cap 161 of the valve member 162. Then the forward end member 151, which may be an annular ring member, is inserted within the open forward end of the outer shell 154 of the piston head body 152 and secured in place by a retainer ring 168. The assembled piston head assembly 150 is mounted, for example threaded or splined, onto the proximal end 15 of the piston rod 16. The bias spring 166 seats against forward end cap 161 of the valve member 162 and is preloaded against the forward end member 151.

Figure 6:
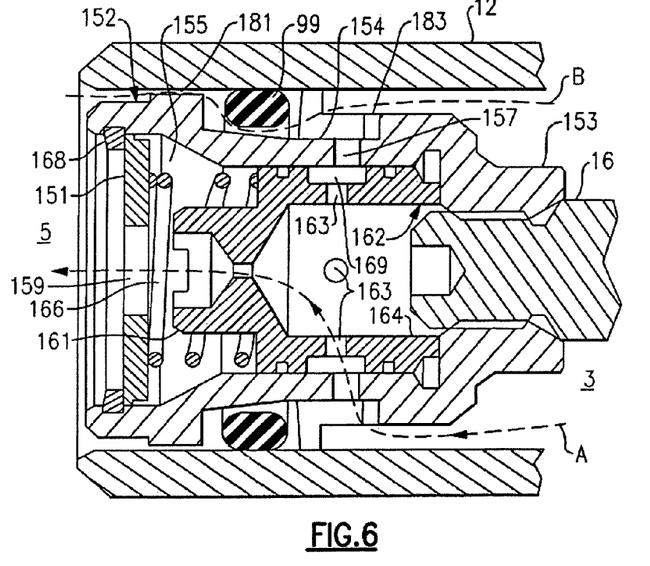
FIG. 6 is an enlarged sectioned elevation view of the embodiment of the flow rate control valve illustrated in the circled region of FIG. 5.
Figure 7:
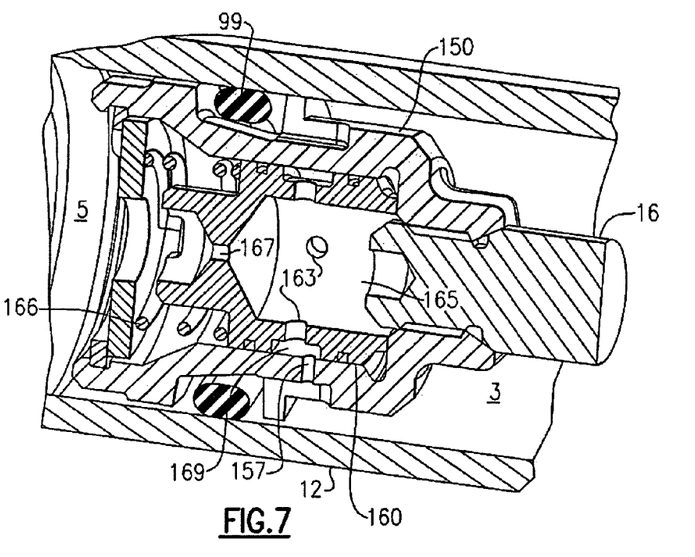
FIG. 7 is a perspective view, in section, of the circled region of FIG. 5.

With the flow rate control valve assembly 160 mounted within the valve chamber 155 of the piston head 150, a first fluid flow path is provided from the high pressure side chamber 3 within the cylindrical tube 12 into the subchamber 165 via at least one first port 157 provided in and extending through the circumferential wall of the outer shell 154, through a groove 169 and at least one second port 163 provided in and extending through the circumferential wall of the generally cylindrical body 164 of the valve member 162. A second fluid flow path is provided from the subchamber 165 via the central opening 167 in the forward end cap 161 of the valve member 162 into the valve chamber 155 of the piston head assembly 150 and thence into the low pressure side chamber 5 within the cylindrical tube 12 via the central opening 159 provided in the forward end member 151. Together, these fluid flow paths provide fluid flow communication between the first chamber 3 and the second chamber 5 via the flow rate control valve assembly 160.

In each of the exemplary embodiments of the rate control device 10 depicted in FIGS. 1-8, linear rate control is achieved through adjustment of the degree of registration of the edge of the groove 69, 169 in the circumferential wall of the generally cylindrical body 64, 164 of the valve member 62, 162 with the first ports 57, 157 provided in and extending through the circumferential wall of the respective outer shells 54, 154 in response the fluid pressure within the respective subchamber 65, 165. In traversing the flow rate control valve assemblies 60, 160 disposed within the respective piston head assemblies 50, 150, high pressure fluid passes from the high side pressure chamber 3 through a first orifice or set of first orifices defined by the overlapping flow area common to both the first port or set of ports 57, 157 and the groove 69, 169 in the valve member 62, 162 and through the second port or set of ports 63, 163 into the respective subchambers 65, 165 and thence out of the subchambers 65, 165 through a second orifice having a fixed area formed by the central opening 67, 167 in the respective end caps 61, 161 of the respective valve members 62, 162 to pass into the low side pressure chamber 5. Thus, the fluid flowing from the high pressure side chamber 3 through the piston head assembly 50, 150 to the low pressure side chamber 5 traverses two orifices disposed in series, one being a variable flow area orifice and one being a fixed area orifice.

As the fluid passes through the first orifice or set of first orifices into subchamber 65, 165, a fluid pressure drop occurs. As the fluid passes out of subchamber 65, 165, a second pressure drop occurs. Consequently, the fluid pressure within subchamber 65, 165 is at an intermediate pressure that is at a pressure level between the high side fluid pressure in chamber 3 and the low side fluid pressure in chamber 5. The valve members 62, 162 move axially within the respective valve chambers 55, 155 in response to this intermediate fluid pressure within the respective subchambers 65, 165 until a force balance exists between the pressure force acting on valve member 62, 162 and opposing spring force imposed on valve member 62, 162 by the respective bias spring 66, 166. As valve member 62, 162 repositions axially the degree of registration of the groove 69, 169 in the circumferential wall of the generally cylindrical body 64, 164 of the valve member 62, 162 with the first port or set of ports 57, 157 provided in and extending through the circumferential wall of the respective outer shells 54, 154 will change thereby varying the flow area of the first orifice or set of first orifices. As the fluid pressure within the high side pressure chamber 3 increases under an increasing applied load, the flow area through the first orifice or set of first orifices will decrease, presenting a greater restriction to the flow of fluid therethrough and imparting a greater pressure drop to the fluid passing therethrough. Thus, the first orifice or set of first orifices are effectively self-modulating such that wherever the valve member 62, 162 repositions to again attain a force balance, a relatively constant intermediate pressure will be maintained within the respective subchambers 65, 165 over a relatively wide load range.

As noted previously, the second orifice, formed by the central opening 67, 167 in the valve member 62, 162, has a fixed flow area. Since the fluid pressure on the low pressure side chamber 5 varies by a relatively small amount with applied load and the intermediate fluid pressure within the subchamber 65, 165 is maintained relatively constant over the applied load range as previously explained, the flow rate of fluid exiting the subchamber 65, 165 through the second fixed flow area orifice into the low pressure side chamber 5 will remain substantially constant over a the applied load range. Consequently, fluid flow through the piston head assembly 50, 150 is substantially constant over a wide range of applied load. As a result of a substantially constant fluid flow through the piston head assemblies from the high side pressure chamber 3 to the low side pressure chamber 5, the piston rod 16 of the hydraulic rate control device 10 of the invention exhibits a substantially constant velocity characteristic over a range of applied loads.

Figure 9:
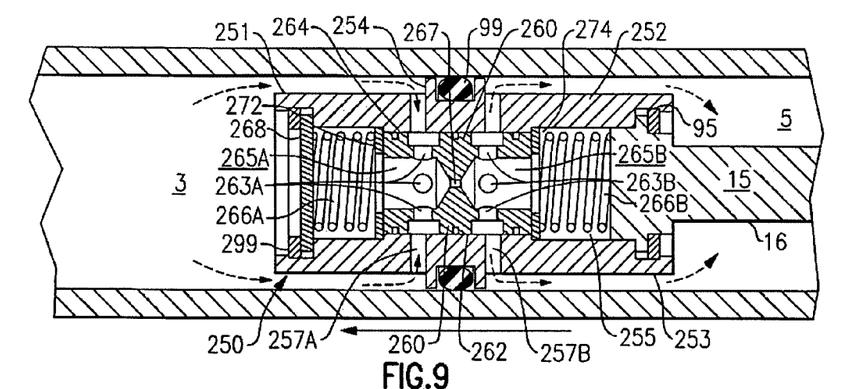
FIG. 9 is a sectioned elevation view of a further embodiment of a flow rate control valve for providing rate control under both compression and tension illustrating compression loading.
Figure 10:
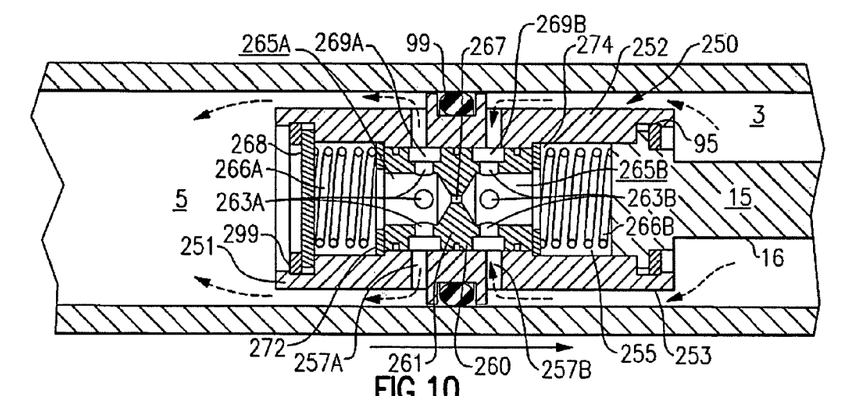
FIG. 10 is a sectioned elevation view of the flow rate control valve of FIG. 9 illustrating tension loading.

Referring now to FIGS. 9 and 10, an additional exemplary embodiment of the hydraulic rate control device 10 which provides linear flow rate control under both compression and tension applied loads. In this embodiment, the rate control device includes a dual-action self-modulated flow rate control valve 260 disposed within the piston head assembly 250 mounted to the proximal end 15 of the piston rod 16. The piston head assembly translates axially within the cylindrical tube 12 as the piston rod 16 slides under load. When the rate control device 10 is loaded in compression by an applied load, the piston rod 16 and the piston head assembly 250 mounted thereto move to the left as illustrated in FIG. 9, thereby causing the fluid pressure within the region of the interior of the cylindrical tube 12 on the forward side of the piston head assembly 250 to increase. Conversely, when the rate control device 10 is loaded in tension by an applied load, the piston rod 16 and the piston head assembly 250 mounted thereto move to the right as illustrated in FIG. 10, thereby causing the fluid pressure within the region of the interior of the cylindrical tube 12 on the rearward side of the piston head assembly 250 to increase. When referring to the embodiment depicted in FIGS. 9 and 10, the region of the interior of the cylindrical tube 12 in which pressure is increasing upon movement of the piston rod 16 will be designated as the high side pressure chamber 3 and the region on the oppose side of the piston head assembly 250 will be designated as the low side pressure chamber 5.

The piston head assembly includes a generally cylindrical shell-like body 252 having a forward end 251 and a rearward end 253. The piston head body 252 is mounted to the proximal end 15 of the piston rod 16, for example by means of a locking ring 95, as illustrated in the FIGS. 9 and 10, or by threading onto the tip of the proximal end 15 of the piston rod 16, or by using any other releasable mechanical attachment device. The piston head assembly 250 carries an O-ring seal 99 that engages the inner wall of the cylindrical tube 12. In the depicted embodiment, the O-ring 99 is carried about its center section 254. The piston head body 252 defines an interior cavity 255, referred to herein as a valve chamber, which houses the flow rate control valve 260.

The flow rate control valve 260 includes an axially positionable valve member 262 disposed intermediate a pair of bias springs 266A and 266B that are retained within the valve chamber 255 by the end face of the piston rod 16 at one end and by a retaining plate 268 secured into the forward end of the piston head body 252 by a retaining ring 299. The forward bias spring 266A seats upon the retaining plate 268 and upon a spring seat ring 272 that abuts the forward end face of the valve member 262. The rearward bias spring 266B seats upon the end face of the proximal end 15 of the piston rod 16 and upon a spring seat ring 274 that abuts the rearward end face of the valve member 262. The valve member 262 has a generally cylindrical body 264 defining an interior which is subdivided by an interior wall member 261 into a forward subchamber 265A and a rearward subchamber 265B. A central opening 267 is provided in the interior wall member 261 that forms a fixed flow area orifice linking the subchambers 265A and 265B in fluid flow communication.

To assemble the flow rate control valve 260, the valve member 262 is inserted and positioned centrally within the valve chamber 255 defined by the valve body 252. The forward and rearward spring seat rings 272 and 274 are then inserted into the valve chamber 255 through the open forward and rearward ends, respectively, of the valve body 252, followed by the forward and rearward bias springs 266A and 266B, respectively. The retaining plate 268 is then positioned into the open forward end of the piston bead body 252 and secured therein by installation of the retaining ring 299. The rearward end 253 of the assembled piston head assembly 250 is then slid onto the proximal end 15 of the piston 16 and secured thereto by installation of the locking ring 95.

A first set of first ports 257A are provided in and extend through the valve body 252 at a location forward of the center section 254 of the valve body 252. Additionally, a second set of first ports 257B are provided in and extend through the valve body 252 at a location rearward of the center section 254 of the valve body 252. In the depicted embodiment, each of the first set of first ports 257A and the second set of first ports 257B are formed of four holes placed at 90-degree intervals about the circumference of the valve body 252 with the first set of first ports 257A being positioned slightly forward of the center section 254 and the second set Of first ports 257B being positioned slightly rearward of the center section 254.

A first set of second ports 263A are provided in and extend through the wall of the valve member 262 to open into the forward subchamber 265A defined within the valve member 262. Additionally, a second set of second ports 263B are provided in and extend through the wall of the valve member 262 to open into the rearward subchamber 265B defined within the valve member 262. In the depicted embodiment, each of the first set of second ports 263A and the second set of second ports 263B are formed of four holes placed at 90-degree intervals about the circumference of the valve member 262. Grooves 269A and 269B are also formed in the circumference of the valve member 262 that intersect the ports 263A and 263B, respectively.

With the flow rate control valve assembly 260 mounted within the valve chamber 255 of the piston head 250, a first fluid flow path is provided establishing fluid flow communication between the region within the interior of the cylindrical tube 12 located forward of the piston head 250 (chamber 3 in FIG. 9, chamber 5 in FIG. 10) and the forward subchamber 265A via the first set of first ports 257A provided in and extending through the circumferential wall of the valve body 252 and groove 269A and the first set of second ports 263A provided in and extending through the circumferential wall of the valve member 262. A second fluid flow path is provided establishing fluid flow communication between the region within tie interior of the cylindrical tube 12 located rearward of the piston head 250 (chamber 5 in FIG. 9, chamber 3 in FIG. 10) and the: rearward subchamber 265B via the second set of first ports 257B provided in and extending through the circumferential wall of the valve body 252 and groove 269B and the second set of second ports 263B provided in and extending through the circumferential wall of the valve member 262. As noted previously, the central opening 267 provided in the interior wall member 261 provides a fixed flow area orifice establishing fluid flow communication between the valve subchambers 265A and 265B. Together, the first and second fluid flow paths and the fluid flow passage linking the first and second valve subchambers 265A and 265B establish fluid flow communication between the high side pressure chamber 3 and the low side pressure chamber 5 via the flow rate control valve assembly 260.

In the exemplary embodiment of the rate control device 10 of the invention depicted in FIGS. 9-10, linear rate control is achieved through adjustment of the degree of registration of the first set of first ports 257A and the second set of first ports 257B provided in and extending through tie circumferential wall of the valve body 252 with the grooves 269A, 269B, respectively, in the circumference of the valve member 262, which communicate with the first set of second ports 263A and the second set of second ports 263B, respectively, provided in and extending through the circumferential wall of the valve member 262 in response the fluid pressure within the respective subchambers 265A and 265B. When under compression loading as depicted in FIG. 9, high pressure fluid passes from the high side pressure chamber 3 through a set of first orifices defined by the overlapping flow area common to both the first set of first ports 257A and groove 269A and the first set of second ports 263A into the forward subchamber 265A and thence through a second fixed flow area orifice defined by the central opening 267 into the rearward subchamber 265B and thence the fully in registration second set of second ports 263B and groove 269B and the second set of second ports 257B to pass into the low side pressure chamber 5. When under tension loading as depicted in FIG. 10, high pressure fluid passes from the high side pressure chamber 3 through a set of first orifices defined by the overlapping flow area common to both the second set of first ports 257B and groove 269B and the second set of second ports 263B into the rearward subchamber 2655B and thence through a second fixed flow area orifice defined by the central opening 267 into the forward subchamber 265A and thence through the fully in registration first set of second ports 263A and groove 269A and the first set of second ports 257A to pass into the low side pressure chamber 5.

Under either compression or tension loading, as the high pressure fluid passes through the set of first orifices into either the forward subchamber 265A or the rearward subchamber 265B, a fluid pressure drop occurs. Consequently, the fluid pressure within the subchamber of the subchambers 265A and 265B into which fluid first enters from the high side pressure chamber 3 is at an intermediate pressure that is at a pressure level between the high side fluid pressure in chamber 3 and the low side fluid pressure in chamber 5. A further pressure drop occurs as that intermediate pressure fluid passes through the second fixed flow area orifice defined by the central opening 267 into the other of the subchambers 265A and 265B, which will be at a fluid pressure nearly in equilibrium with the fluid pressure in the low side pressure chamber 5.

When a compression load is applied, the piston head assembly 250 moves to the left within the cylindrical tube 12 as illustrated in FIG. 9 and the valve member 262 moves axially to the right within the valve chamber 255 in response to the intermediate fluid pressure within the forward subchamber 265A until a force balance exists between the force of the intermediate pressure acting on valve member 262 and the opposing spring force imposed on valve member 262 by the rearward bias spring 266B. As valve member 262 repositions axially to the right, the degree of registration of the first set of first ports 257A with the groove 269A in the circumference of the valve member 262 associated with the first set of second ports 263A will decrease thereby reducing the flow area of the set of first orifices, while groove 269B and the associated second set of first ports 257B will remain in full registration with the second set of second ports 263B.

When a tension load is applied, the piston head assembly 250 moves to the right within the cylindrical tube 12 as illustrated in FIG. 10 and the valve member 262 moves axially to the left within the valve chamber 255 in response to the intermediate fluid pressure within the rearward subchamber 265B until a force balance exists between the force of the intermediate pressure acting on valve member 262 and the opposing spring force imposed on valve member 262 by the forward bias spring 266A. As valve member 262 repositions axially to the left, the degree of registration of the groove 269B in the circumference of the valve member 262 and the second set of ports 257B with the second set of second ports 263B will decrease thereby reducing the flow area of tie first set of orifices, while groove 269A and the associated first set of first ports 257A will remain in full registration with the first set of second ports 263A.

In either case, as the fluid pressure within the high side pressure chamber 3 increases under an increasing applied load, the flow area through the set of first orifices will continue to decrease, presenting a greater restriction to the flow of fluid therethrough and imparting a greater pressure drop to the fluid passing therethrough. Thus, the set of first orifices are effectively self-modulating such that wherever the valve member 262 repositions to again attain a force balance, a relatively constant intermediate pressure will be maintained within one of the subchambers 265A, 265B over a relatively wide load range, while the other of the subchambers 265A, 265B will remain at the fluid pressure within the low pressure side chamber 5.

As noted previously, the second orifice, formed by the central opening 267 in the division wall between the subchambers 265A and 265B of the valve member 262 has a fixed flow area. Since the low pressure side varies by a only relatively small amount with applied load and the intermediate fluid pressure within is maintained relatively constant over the applied load range as previously explained, the flow rate of fluid passing through the second fixed flow area orifice and exiting into the low pressure side chamber 5 will remain substantially constant over the applied load range. Consequently, fluid flow through the piston head assembly 250 is substantially constant over a wide range of applied load. As a result of a substantially constant fluid flow through the piston head assemblies from the high side pressure chamber 3 to the low side pressure chamber 5, the piston rod 16 of the hydraulic rate control device 10 of the invention exhibits a substantially constant velocity characteristic over a range of applied loads, whether in compression or in tension.

The respective circumferential grooves 69, 169, 269 provided in the outer portion of the valve members 62, 162, 262 facilitate registration of the respective second ports 63, 163, 263 formed in the valve members with their corresponding first ports 57, 157, 257 formed in the valve body and ensure full registration when pressure equilibrium exists between the chambers 3 and 5 on opposite sides of the piston head assembly. In the embodiments depicted in FIGS. 1-10, up to four first ports 57, 157, 257A, 257B comprising round holes, directed radially relative to the longitudinal axis 11, are provided at circumferentially spaced 90-degree intervals about the circumference of the respective valve body and four second ports 63, 163, 263A, 263B comprising radially directed holes are provided at circumferentially spaced 90-degree intervals about the circumference of the respective valve member 262 in communication with the respective groove 69, 169 or grooves 269 extending about the circumference of the respective valve member 262. However, it is to be understood that the particular number of polls and the cross-sectional shape of the ports are a matter of design choice.

Figure 11:
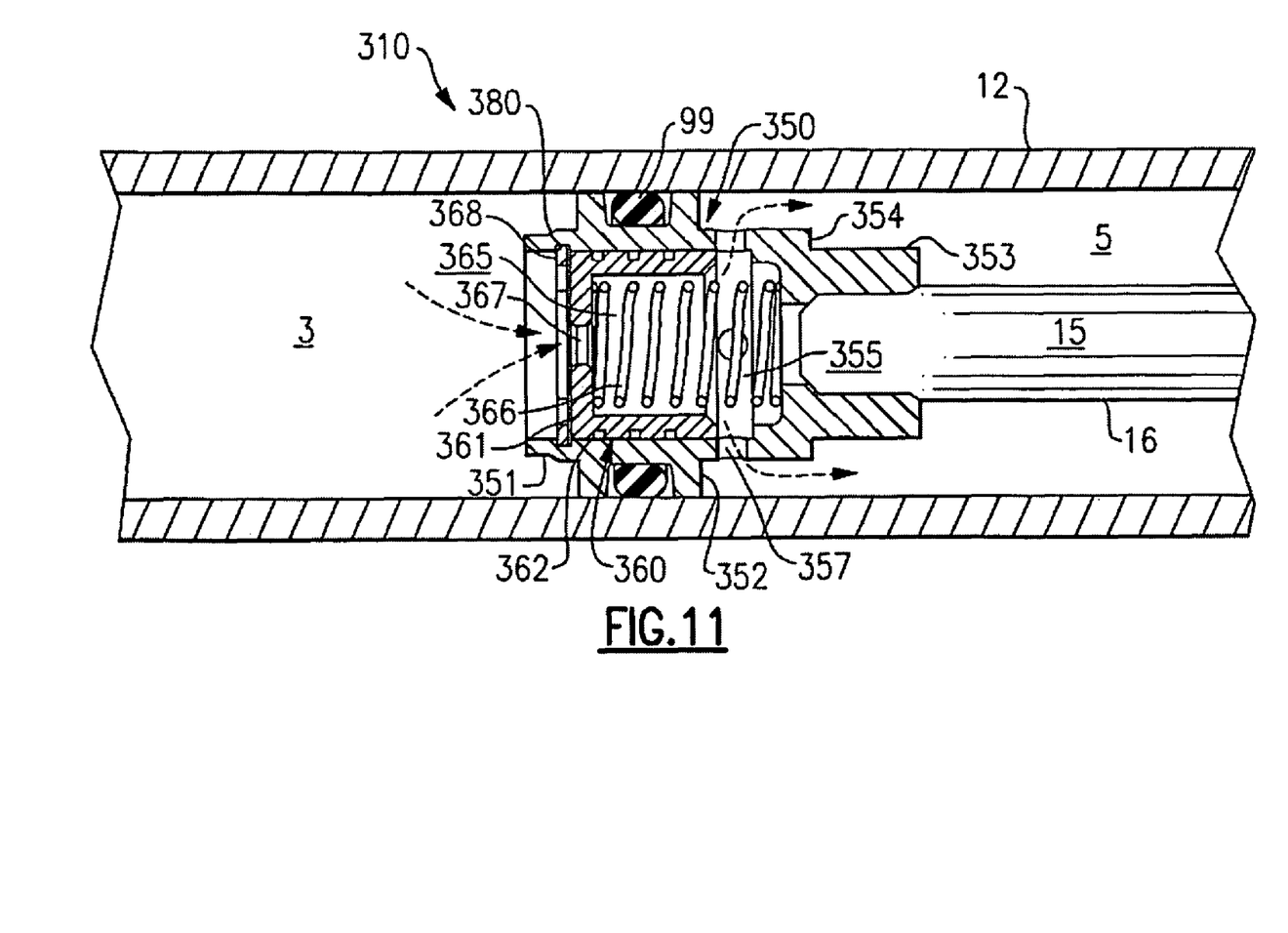
FIG. 11 is a sectioned elevation view of an alternate embodiment of a flow rate control valve for providing rate control under compression loading.

Referring now specifically to FIG. 11, a hydraulic rate control device 310 is depicted wherein relatively linear flow rate control is provided under a compression load via a flow rate control valve 360 disposed within the piston head assembly 350. The piston head assembly 350 includes a piston head body 352 having a generally cylindrical outer shell 354 having an open forward end face 351 and a rearward end 353 mounted to the proximal end 15 of the piston rod 16. The piston head assembly 350 is axially moveable within the interior of the cylindrical tube 12. The piston head body 352 carries an outer O-ring seal 99 that engages the inner wall of the cylindrical tube 12. The outer shell 354 of the piston head body 352 defines an interior cavity 355, referred to herein as a valve chamber, which houses the flow rate control valve 360. At least one port 357, and generally a set of ports 357 as illustrated in FIG. 11, are provided in and extend through the circumferential wall of the generally cylindrical outer shell 354 of the piston head body 352 to open into the valve chamber 355.

The flow rate control valve 360 includes an axially positionable valve member 362 and a bias spring 366 that are retained within the valve chamber 355 by means of a valve retainer body 368 secured within the open forward end 351 of the outer shell 354. The valve member 362 has a generally cylindrical body with a forward end cap 361. The valve member 362, when inserted into the valve chamber 355, defines in association with the piston head body 352 a subchamber 365 within the valve chamber 355. A central opening 367 is provided in the forward end cap 361. The bias spring 366 is positioned within the valve chamber 355 rearwardly of the valve member 362 and seats against the interior wall of the valve body 352 at the rearward end of the valve chamber 355 and against the valve member 362. The valve member 362 is foreshortened such that when the valve member 362 is biased foully forwardly by the bias spring 366, the rearward end of the valve member 362 terminates short of the at least one port or set of ports 357 in the valve body 352.

To assemble the flow rate control valve 360, the axially positionable the bias spring 366 is inserted into the valve chamber 355 through the open forward end 351 of the outer shell 354, followed by the valve member 362. Then the valve retainer ring 368 is inserted into the open forward end flange 351 of the outer shell 354 and seated into a circumferential locking recess 380 provided in the inner wall of the outer shell 354. The assembled piston head assembly 350 is then mounted, for example threaded or splined, onto the proximal end 15 of the piston rod 16. The valve retainer ring 368 serves not only to retain the valve member 362 and bias spring 366 within the valve chamber 355, but also to preload the bias spring 366 against the interior wall of the valve body 352 at the rearward end of the valve chamber 355. The locking recess may be located axially so as to provide the desired preloading of the bias spring 366 when the flow rate control valve 360 is assembled.

With the flow rate control valve assembly 360 mounted within the valve chamber 355 of the piston head 350, a first fluid flow path is provided from the high pressure side chamber 3 within the cylindrical tube 12 into the subchamber 365 within the valve member 362 via a fixed flow area orifice defined by the central opening 367 is provided in the forward end cap 361. A second fluid flow path is provided from the subchamber 365 into the low side pressure chamber 5 within the cylindrical tube 12 via the at least one port or set of ports 357 provided in and extending through the circumferential wall of the outer shell 354 of the piston head body 352. Together, these fluid flow paths provide fluid flow communication between the first chamber 3 and the second chamber 5 via the flow rate control valve assembly 360.

In this embodiment, constant velocity rate control is achieved through self-adjustment of the degree of the total flow area of the port or set of ports 357 that is open to flow via axial repositioning of the valve member 362 in response to the fluid pressure differential between the fluid pressure within the high side pressure chamber 3 and the fluid within the subchamber 365. As the valve member 362 repositions rearwardly in response to an increasing pressure differential across the forward end face of the valve member 362, the rearward end of the valve member 362 will physically overlap and thereby close-off a portion of the flow area provided by the each of the port or set of ports 357 in the outer shell 354 of the piston head body 352, thereby decreasing the effective flow area therethrough. In traversing the flow rate control valve assembly 360, the fluid experiences a first pressure drop as the fluid passes from the high side pressure chamber 3 into the subchamber 365 through the fixed area orifice defined by the central opening 367 in the forward cap of the valve member 362 and then experiences a second pressure drop as it passes from the subchamber 365 into the low side pressure chamber 5 through the variable flow area orifice defined by the degree of openness of the port or set of ports 357.

Consequently, the fluid pressure within subchamber 365 is at an intermediate pressure that is at a pressure level between the high side fluid pressure in chamber 3 and the low side fluid pressure in chamber 5. The valve member 362 moves axially within the valve chamber 355 in response to the pressure differential across the forward end cap of the valve member 362 until a force balance exists between the high side pressure force acting on valve member 362 and the combined opposing force imposed upon the valve member 362 by the intermediate pressure within the subchamber 365 and by the bias spring 366. Thus, as the fluid pressure within the high side pressure chamber 3 increases under an increasing applied load, the flow area through the variable flow area orifice will decrease, presenting a greater restriction to the flow of fluid therethrough. As a result the intermediate pressure within the subchamber 365 will increase in response to the increase in the high side fluid pressure, but the flow area of the variable flow area orifice through the set the of openings 357 through which the fluid exits the subchamber 365 simultaneous decreases, thereby limiting any increase in flow rate of fluid from the high side pressure chamber 3 through the fixed area orifice of the central opening 367 into the subchamber 365. Consequently, fluid flow through the piston head assembly 350 is relatively constant over a wide range of applied load and the piston rod 16 of the hydraulic rate control device 310 exhibits a relatively constant velocity characteristic over a range of applied loads.

While this invention has been particularly shown and described in detail the reference to the preferred embodiments as illustrated in the drawing, it should be appreciated that the present invention is not limited to the precise embodiments illustrated in the drawing. For example, the set of first and second ports may comprise any suitable number of openings of any desired cross-sectional shape. Additionally, any suitably equivalent biasing device may be employed in place of the spring bias as a means of imposing a biasing force upon the valve member.

Accordingly, it will be understood by one skilled in the art that various changes in detail may be effected therein without departing from the spirit and scope of the invention as defined by the claims.

I claim:

1. A linear rate control device having a substantially constant velocity characteristic over an applied load range, said device comprising:
    an outer cylinder having a first end, a second end and defining an interior chamber having a longitudinal axis and containing a hydraulic fluid;
    a piston including a piston rod having a proximal end and a distal end and a piston head mounted to said proximal end and slidably positionable within said interior chamber, said piston rod extending longitudinally along the longitudinal axis of said interior chamber from said proximal end through the first end of said outer cylinder to said distal end, said piston head defining an interior cavity;
    a rate control valve disposed within the interior cavity of said piston head coaxially with the longitudinal axis of said interior chamber, said rate control valve including a fixed flow rate orifice disposed in series relationship with respect to fluid flow through said rate control valve with a variable flow rate orifice defined by positioning of said rate control valve within said piston head, said rate control valve being in an open configuration nominally.

2. A linear rate control device as recited in claim 1 wherein said variable flow rate orifice comprises a flow entrance for fluid flow to enter said rate control valve from said interior chamber on a high pressure side of said piston head.

3. A linear rate control device as recited in claim 2 wherein said fixed flow area orifice comprises a flow exit for fluid flow to pass from said rate control valve into said interior chamber on a low pressure side of said piston head.

4. A linear hydraulic rate control device as recited in claim 1 wherein said variable flow rate orifice comprises a flow exit for fluid flow to pass from said rate control valve into said interior chamber on a low pressure side of said piston head.

5. A linear rate control device as recited in claim 4 wherein said fixed flow area orifice comprises a flow entrance for fluid flow to enter said rate control valve from said interior chamber on a high pressure side of said piston head.

6. A linear rate control device as recited in claim 1 comprising a controlled flow passage established though said rate control valve during a movement of said piston rod under an applied compression load and an uncontrolled flow passage established outside said piston head during a movement of said piston rod under an applied tensile load.

7. A linear rate control device as recited in claim 1 comprising a controlled flow passage established through said rate control valve during a movement of said piston rod under an applied tensile load and an uncontrolled flow passage established outside said piston head during a movement of said piston rod under an applied compression load.

8. A rate control device having a substantially constant velocity characteristic over an applied load range, comprising:
    an outer cylinder having a first end, a second end and defining an interior chamber having a longitudinal axis and containing a hydraulic fluid;
    a piston including a piston rod having a proximal end and a distal end and a piston head mounted to said proximal end and slidably positionable within said interior chamber, said piston rod extending longitudinally along the longitudinal axis of said interior chamber from said proximal end through the first end of said outer cylinder to said distal end, said piston head defining an interior cavity and having at least one first port therethrough in fluid communication with said interior chamber;

a rate control valve slidably retained within the interior cavity of said piston head and disposed coaxially with the longitudinal axis of said interior chamber, said rate control valve defining a subchamber within the interior cavity of said piston head and having at least one groove provided in and extending about an outer circumference of said rate control valve and at least one second port establishing fluid communication between said subchamber and said at least one groove, a bias spring operatively associated with said rate control valve;

a fixed flow area orifice provided in said rate control valve, said fixed area orifice establishing a restricted fluid flow path between said subchamber and said interior chamber on one of a low pressure side of said piston head or a high pressure side of said piston head; and an orifice having a variable flow area formed cooperatively by registration of the at least one first port through said piston head and said at least one groove in the outer circumference of said rate control valve in fluid communication with the at least one second port through said rate control valve, said variable flow area orifice establishing a restricted fluid flow path between said subchamber and said interior chamber on the other of the high pressure side of said piston head or the low pressure side of said piston head;

said rate control valve being axially repositionable within said interior cavity of said piston head against said bias spring in response to the fluid pressure within said subchamber to vary the flow area through said variable flow area orifice.

9. A rate control device as recited in claim 8 wherein said piston head has a generally cylindrical body defining said interior cavity and said at least one first port through said piston head comprising at least one hole having a first diameter and passing radially through said generally cylindrical body.

10. A rate control device as recited in claim 9 wherein said rate control valve has a generally cylindrical valve body defining said subchamber and said at least one second port comprises at least one hole passing radially through said generally cylindrical valve body into said at least one groove in the circumference of the cylindrical valve body in fluid flow communication with said at least one first port through said piston head.

11. A rate control device as recited in claim 8 wherein said rate control valve has a generally cylindrical valve body defining said subchamber and having an open end and a capped end, said fixed flow area orifice comprising an opening formed through said capped end, and said at least one second port comprising at least one opening through said generally cylindrical valve body in fluid flow communication with said at least one first port through said piston head via said at least one groove.

12. A rate control device as recited in claim 8 wherein:

said piston head had a generally cylindrical body defining said interior cavity and a plurality of first ports disposed at circumferentially spaced intervals about and passing radially through said generally cylindrical body; and said rate control valve has a generally cylindrical valve body defining said subchamber and a plurality of second ports disposed at circumferentially spaced intervals about and passing radially though said generally cylindrical valve body in fluid flow communication with said plurality of first ports through said piston head via said at least one groove.

13. A rate control device having a substantially constant velocity characteristic over an applied load range, comprising:

an outer cylinder having a first end, a second end and defining an interior chamber having a longitudinal axis and containing a hydraulic fluid;

a piston including a piston rod having a proximal end and a distal end and a piston head mounted to said proximal end and slidably positionable within said interior chamber, said piston rod extending longitudinally long the longitudinal axis of said interior chamber from said proximal end through the first end of said outer cylinder to said distal end, said piston head defining an interior cavity and having at least one first port therethrough in fluid communication with said interior chamber;

a rate control valve slidably retained within the interior cavity of said piston head and disposed coaxially with the longitudinal axis of said interior chamber, said head and having at least one groove provided in and extending about an outer circumference of said rate control valve and at least one second port establishing fluid communication between said subchamber and said at least one groove, a bias spring operatively associated with said rate control valve;

a fixed flow area orifice provided in said rate control valve, said fixed area orifice establishing a restricted fluid flow path between said subchamber and said interior chamber on a low pressure side of said piston head; and an orifice having a variable flow area formed cooperatively by registration of the at least one first port through said piston head and said at least one groove in the outer circumference of the rate control valve in communication with the at least one second port through said rate control valve, said variable flow area orifice establishing a restricted fluid flow path between said subchamber and said interior chamber on the high pressure side of said piston head;

said rate control valve being axially repositionable within said interior cavity of said piston head against said bias spring in response to the fluid pressure within said subchamber to vary the flow area through said variable flow area orifice.

14. A rate control device as recited in claim 13 wherein said piston head has a generally cylindrical body defining said interior cavity and said at least one first port through said piston head comprises at least one hole having a first diameter and passing radially through said generally cylindrical body.

15. A rate control device as recited in claim 14 wherein said rate control valve has a generally cylindrical valve body defining said subchamber and said at least one second port comprises at least one hole passing radially through said generally cylindrical valve body into said at least one groove in the circumference of the cylindrical valve body in fluid flow communication with said at least one first port through said piston head.

16. A rate control device as recited in claim 13 wherein said rate control valve has a generally cylindrical valve body defining said subchamber and having an open end and a capped end, said fixed flow area orifice comprising an opening formed through said capped end, and said at least one second port comprising at least one port through said generally cylindrical valve body in fluid flow communication with said at least one first port through said piston head via said at least one groove.

17. A rate control device as recited in claim 13 wherein:
said piston head has a generally cylindrical body defining said interior cavity and a plurality of first ports disposed at circumferentially spaced intervals about and passing radially through said generally cylindrical valve body; and said rate control valve has a generally cylindrical valve body defining said subchamber and a plurality of ports disposed at circumferentially spaced intervals about and passing radially through said generally cylindrical valve body in fluid flow communication with said plurality of first ports through said piston head via said at least one groove.

18. A rate control device having a substantially constant velocity characteristic over an applied load range, comprising:

an outer cylinder having a first end, a second end and defining an interior chamber having a longitudinal axis and containing a hydraulic fluid;

a piston including a piston rod having a proximal end and a distal end and a piston head mounted to said proximal end and slidably positionable within said interior chamber, said piston rod extending longitudinally along the longitudinal axis of said interior chamber from said proximal end through the first end of said outer cylinder to said distal end, said piston head defining and interior cavity;

a rate control valve slidably retained within the interior cavity of said piston head and disposed coaxially with the longitudinal axis of said interior chamber, said rate control valve defining a subchamber within the interior cavity of said piston head, a bias spring operatively associated with said rate control valve;

a first orifice provided in said rate control valve, said first orifice having a fixed flow area therethrough and establishing a restricted fluid flow path between said subchamber and said interior chamber on a high pressure side of said piston head; and a second orifice formed by at least one first port opening through said piston head, said second orifice establishing a restricted fluid flow path between said subchamber and said interior chamber on the low pressure side of said piston head;

said rate control valve being axially repositionable within said interior cavity of said piston head against said bias spring in response to the differential fluid pressure between the pressure on the high pressure side of the piston head and the pressure within said subchamber to vary the flow area through said second orifice.

19. A rate control device as recited in claim 18 wherein said rate control valve has a generally cylindrical valve body defining said subchamber and having an open end and a capped end, said fixed flow area orifice comprising an opening formed through said capped end.

20. A rate control device as recited in claim 18 wherein said piston head has a generally cylindrical body defining said interior cavity and said at least one first port through said piston head comprises at least one hole having a first diameter and passing radially through said generally cylindrical body.

21. A rate control device as recited in claim 18 wherein:
said piston head has a generally cylindrical body defining said interior cavity and a plurality of first ports disposed at circumferentially spaced intervals about and passing radially through said generally cylindrical body.

22. A rate control device as recited in claim 18 wherein said rate control valve has a generally cylindrical valve body defining said subchamber and having a foreshortened outer wall that partially closes the flow area of at least one port to fluid flow therethrough when said rate control valve moves against said bias spring in response to the differential fluid pressure between the pressure on the high pressure side of the piston head and the pressure within said subchamber.

23. A rate control device having a substantially constant velocity characteristic over a range of applied load in both compression and tension loading, comprising:

an outer cylinder having a first end, a second end and defining an interior chamber having a longitudinal axis and containing a hydraulic fluid;

a piston including a piston rod having a proximal end and a distal end and a piston head mounted to said proximal end and slidably positionable within said interior chamber, said piston rod extending longitudinally along the longitudinal axis of said interior chamber from said proximal end through the first end of said outer cylinder to said distal end, said piston head defining an interior cavity;

a rate control valve slidably retained within the interior cavity of said piston head and disposed coaxially with the longitudinal axis of said interior chamber, said rate control valve defining an interior chamber and having an interior wall dividing the interior chamber into a first subchamber and a second subchamber, a first bias spring operatively associated with said rate control valve, said first bias spring disposed in the interior cavity of said piston head forwardly of said rate control valve;

a second bias spring operatively associated with said rate control valve, said second bias spring disposed in the interior cavity of said piston head rearwardly of said rate control valve;

a fixed flow area orifice provided in the interior wall of said rate control valve, said fixed area orifice establishing a restricted fluid flow path between said first and second subchambers a first variable flow area orifice establishing a restricted fluid flow path between said first subchamber and said interior chamber on one of a high pressure side of said piston head or a low pressure side of said piston head; and a second variable flow area orifice establishing a restricted fluid flow path between said second subchamber and said interior chamber on the other of a low pressure side of said piston head or a high pressure side of said piston head;

said rate control valve being axially repositionable within said interior cavity of said piston head against one of said first and second bias springs in response to an intermediate fluid pressure within one of said first and second subchambers to vary the flow area through one of said first and second variable flow area orifices.

* * * * *